Patented Sept. 27, 1927.

1,643,699

UNITED STATES PATENT OFFICE.

GEORGE W. COGGESHALL AND ARTHUR REILLY, OF WASHINGTON, DISTRICT OF COLUMBIA, ASSIGNORS TO THE JEFFERSON CONSTRUCTION AND OIL TREATING COMPANY, OF WASHINGTON, DISTRICT OF COLUMBIA, A CORPORATION OF THE DISTRICT OF COLUMBIA.

PROCESS OF TREATING EMULSIONS.

No Drawing. Application filed November 10, 1924, Serial No. 749,086. Renewed March 1, 1927.

Our present invention relates to the treatment of petroleum emulsions for the separation thereof into two fractions, namely, a fraction containing the oil content of the emulsions, and a fraction containing the water content of the emulsion, impurities and the like.

In the petroleum industry the oil as taken from the earth contains in many cases a substantial amount of emulsified water, which water is in the form of a relatively permanent emulsion, in which the water and oil do not readily separate. The emulsion in many cases separates from the clear oil and this emulsion is known under various names, it commonly being referred to as "Bottom Settlings" or "B. S."

B. S. is an emulsion which is not readily capable of separation by merely settling and many attempts and many proposals have been made to de-emulify B. S., in order that the oil content thereof can be separated from the water content, and in order to obtain the oil in a sufficiently pure state for sale as crude oil.

Among the various processes which have heretofore been proposed for the treatment of B. S., and similar emulsions, we may mention treatment of heated B. S., with a solution of ordinary soap, followed by settling. Other proposals have been made for the treatment of B. S., or similar emulsions with solutions of various salts. Up to the present time, however, none of the processes heretofore proposed have been found to give entirely satisfactory results.

These petroleum emulsions are of the type where water (or water solution) is present in tiny droplets in a continuous mass (phase) of oil.

One theory of the stability of these emulsions is that some particular material is present besides water and oil. This material may often be a colloidal material which is present on the interfaces between the water particles and the oil and forms a tough elastic film around each water droplet. It may be (or the tiny water droplet may be) negatively charged but the best opinion is that such electric charge if present does not account for the stability of all B. S. emulsions.

The stabilizing agent or colloid in the film above mentioned appears to be more easily wetted by oil than by water, or it causes the film to be more easily wetted by oil than by water. In B. S. emulsions this stabilizing agent is believed to be an asphaltic body or hydrated earthy matter which has absorbed an asphaltic body and it must be in an extremely finely divided state to enable it to completely cover all the tiny water droplets.

The surface tension between the emulsifying agent (the stabilizing agent) and the oil is less than between the emulsifying agent and the water. Therefore the oil wets the emulsifying agent more easily than water does.

Anything which tends to make the surface tension between oil and the film greater or which tends to disrupt the film by making the stabilizing agent more soluble in the oil, thereby removing some or all of it from the film, or which tends to make the stabilizing agent flocculate into larger particles thereby not allowing it to completely envelop the tiny water droplets, will tend to decrease the stability of the films and will allow the tiny water droplets to unite to form drops heavy enough to settle to the bottom.

In accordance with the present invention, we have found that a relatively rapid and relatively complete separation of the water from the oil can be secured by a two step mixing process which comprises:

First, agitating the emulsion with an emulsion-breaking agent, preferably a soap solution, although solutions of various salts or mixtures of other emulsion-breaking materials can be used, (namely such materials as have been more or less successfully used for breaking certain of these petroleum emulsions, but which have failed of breaking other petroleum emulsions);

Second, agitation with a neutral solution of an alkali metal salt or an alkaline earth metal salt, for example sodium chloride or calcium chloride, and thereafter allowing the material to settle. These salts are given as examples of substances capable of altering the ion-concentration of the aqueous phase of the emulsion. The whole treatment may be conducted at ordinary temperature, or the materials may be in a warmed or heated condition, the choice of temperature depending upon the stability and viscosity of the emulsion.

With respect to the preferred temperatures to be used, it is not our intention to restrict ourselves to the use of specific temperatures. With B. S., or oils containing B. S., which are very viscous, or which are (due to their chemical nature or otherwise) relatively difficult to separate, we prefer to heat the material prior to adding the reagents, this heating may be, for example, up to 150° F., or 175° F., more or less. With other B. S., or B. S. oils, we conduct the treatment at or about ordinary atmospheric temperature. This latter is, of course, cheaper and does not run the risk of driving off any of the light fractions. In cases where the light fractions might be driven off, to any substantial extent, the evolved vapors may be condensed or otherwise recovered.

The effect of the second treatment may be wholly or partly mechanical like a hammer effect; or it may have the effect of making the previously added material which already has reached the water in the droplets, go out on the surface or film surface and do its work; or it may be wholly or partly that it makes the first added material more thoroughly dispersed so it can unite with and have its effect on the films easier or more thoroughly; or it may render easier or more complete any electrical effects; or it may tend to sweep the tiny freed droplets together; or it may increase any tendency of the first material to flocculate the stabilizing material; or it may have local effects due to the difference in concentrations of salts in the added salt water, and that of salt or salts already in the water in the tiny droplets; or it may be a combination of two or more of these effects.

The following example stating proportions, is given for the purpose of illustration:—To 1000 barrels of B. S., there is added 0.2% of common soap (cheap laundry soap will answer) in the form of an aqueous solution of say, about 1% strength, (say 200 barrels of a 1% solution of soap) and the mixture well agitated. There is then added common salt equal to about 1½% of the B. S. (say, 75 barrels of a 20% solution of common salt, which can be a cheap grade of rock salt). The mixture is again well agitated and then is pumped into a deep tank and allowed to settle, the oil coming to the top.

Whatever may be the real causes of the effect of the second treatment, we have found that it is effective in increasing the rapidity and completeness of the separation of water and oil in the subsequent quiet settling period. The present invention therefore, covers the process comprising an agitation with a soap solution, or with solutions or mixtures of chemical substances which have to a certain degree the property of breaking water-in-oil emulsions, and followed by a second agitation with a neutral water solution of an alkali metal salt or an alkali earth metal salt, and subsequent quiet settling period, the process in most cases being effective at ordinary temperatures, but the materials may be in a warmed or heated condition in certain stubborn cases.

In the appended claims the expression "alkali-forming metal" is intended to embrace alkali metals and alkaline earth metals, since both of these classes of metal can unite with oxygen or with oxygen and hydrogen, to form "alkalies".

It will be understood, of course, that the several materials or ingredients may be mixed or united in any desired sequence, or all may be mixed together at one and the same time.

We claim:

1. A process of breaking petroleum emulsions which comprises treating such emulsions with an emulsion breaking material, adding and agitating such mixture with a neutral water solution of a salt of an alkali-forming metal, then subjecting to gravity separation.

2. A process of breaking petroleum emulsions which comprises treating such emulsions with an emulsion breaking material, adding and agitating such mixture with a neutral solution of a salt of an alkali-forming metal, the materials being at substantially ordinary atmospheric temperature, then subjecting to gravity separation.

3. A process which comprises mixing a petroleum emulsion with a soap solution, then mixing with a solution of a salt of an alkali-forming metal, and allowing sedimentation.

4. In the process of claim 3, the addition to the petroleum emulsion of about 0.2% of soap and about 1.5% of common salt.

5. In the treatment of petroleum emulsions, the improvement which comprises first treating the emulsions with a reagent comprising a soap of a fatty acid, and then with a reagent capable of altering the ion-concentration of the aqueous phase of the emulsion.

In testimony whereof we affix our signatures.

GEORGE W. COGGESHALL.
ARTHUR REILLY.